United States Patent
Oh et al.

(10) Patent No.: US 8,699,205 B2
(45) Date of Patent: Apr. 15, 2014

(54) PACKAGE TYPE MULTI LAYER THIN FILM CAPACITOR FOR HIGH CAPACITANCE

(75) Inventors: Young Joo Oh, Seoul (KR); Jung Rag Yoon, Yongin-si (KR); Kyung Min Lee, Paju-si (KR); Young Min Yoo, Suwon-si (KR)

(73) Assignee: Samhwa Capacitor Co., Ltd. (KR)

( * ) Notice: Subject to any disclaimer, the term of this patent is extended or adjusted under 35 U.S.C. 154(b) by 44 days.

(21) Appl. No.: 13/599,034

(22) Filed: Aug. 30, 2012

(65) Prior Publication Data

US 2013/0058005 A1    Mar. 7, 2013

(30) Foreign Application Priority Data

Sep. 6, 2011   (KR) .......................... 10-2011-0090151

(51) Int. Cl.
*H01G 4/06* (2006.01)

(52) U.S. Cl.
USPC ................... 361/321.2; 361/321.1; 361/306.1; 361/306.3; 361/311; 361/303

(58) Field of Classification Search
USPC ................ 361/321.2, 321.1, 303–305, 306.1, 361/306.3, 311–313, 308.1
See application file for complete search history.

(56) References Cited

U.S. PATENT DOCUMENTS

| 5,599,757 | A | 2/1997 | Wilson et al. | |
| 6,191,933 | B1* | 2/2001 | Ishigaki et al. | 361/309 |
| 6,579,600 | B1* | 6/2003 | Bowen et al. | 428/198 |
| 7,035,079 | B1* | 4/2006 | Park et al. | 361/303 |
| 7,688,568 | B1* | 3/2010 | Lee et al. | 361/306.3 |
| 8,094,429 | B2* | 1/2012 | Hsu et al. | 361/306.3 |
| 8,178,456 | B2* | 5/2012 | Burn | 501/136 |
| 8,559,160 | B2* | 10/2013 | Kim et al. | 361/303 |
| 8,576,537 | B2* | 11/2013 | Prymak | 361/301.4 |

* cited by examiner

*Primary Examiner* — Nguyen T Ha
(74) *Attorney, Agent, or Firm* — Cantor Colburn LLP

(57) ABSTRACT

Provided is a package type multi-layer thin film capacitor for large capacitance, including: a ceramic sintered body formed with slots on one side and another side thereof, respectively; a plurality of first internal electrode layers formed within the ceramic sintered body; a plurality of second internal electrode layers formed within the ceramic sintered body to be positioned between the plurality of first internal electrode layers; a pair of first main connection electrode members inserted into the slots to be connected to the first internal electrode layers or the second internal electrode layers, respectively; a pair of first main lead members inserted into the slots and to be connected to the first main connection electrode members, respectively; and a sealing member sealing the ceramic sintered body to partially expose each of the pair of first main lead members.

16 Claims, 6 Drawing Sheets

PACKAGE TYPE MULTI LAYER THIN FILM CAPACITOR FOR HIGH CAPACITANCE

CROSS-REFERENCE TO RELATED APPLICATION

This application claims the benefit of Korean Patent Application No. 10-2011-0090151, filed on Sep. 6, 2011, in the Korean Intellectual Property Office, the disclosure of which is incorporated herein by reference.

BACKGROUND OF THE INVENTION

1. Field of the Invention

The present invention relates to a package type multi-layer thin film capacitor for large capacitance, and more particularly, to a package type multi-layer thin film capacitor for large capacitance that may prevent, using a lead member, impact or heat transferred from an outside from being directly transferred to a ceramic sintered body and thereby prevent cracks from occurring due to the impact or the heat.

2. Description of the Related Art

A multi-layer ceramic capacitor (MLCC) has been widely utilized as an electronic part for miniaturization, high power, and high reliability. The MLCC is formed by alternately disposing dielectric layers and internal electrode layers. The use of the MLCC has been expanded to an industrial field or an electric vehicle field and thus, large capacitance thereof has been required. The large capacitance of the MLCC has been performed by manufacturing a green sheet layer as a thin film and thereby increasing the number layers, or by increasing a vertical length and a horizontal length of the internal electrode layer to be tens of mm and thereby increase a surface area.

Hereinafter, a configuration of the conventional MLCC (hereinafter, also referred to as a thin film capacitor) in which the green sheet layer is manufactured as the thin film will be described with reference FIG. 1.

In FIG. 1, the conventional multi-layer thin film capacitor 1 includes a ceramic sintered body 2, a plurality of green sheets 3, a protecting layer 4, and an external electrode 5.

The ceramic sintered body 2 is formed by multi-layering and sintering the.a plurality of green sheets 3, and each of the plurality of green sheets 3 includes a dielectric thin film sheet 3a and an internal electrode layer 3b. The dielectric thin film sheet 3a is formed as a thin film with a thickness of a few to hundreds of μm by applying a high-dispersed slurry production method and a die-coater or a lip coater. The internal electrode layer 3b is formed by applying a metal material such as copper (Cu) on the surface of the dielectric film sheet 3a.

When a green sheet member 2 is formed by alternately disposing the plurality of green sheets 3, the protecting layer 4 is formed by wrapping the peripheral surface of the green sheet member 2 excluding one side and another side of the green sheet member 2 using an insulating film. When the protecting layer 4 is formed, the multi-layer thin film capacitor 1 is manufactured by forming an external electrode 5 for electrically connecting an internal electrode layer 2b on one side and another side of the green sheet member 2. The external electrode 5 is employed when mounting the multi-layer thin film capacitor 1 on a soldering pad 7a of a printed circuit board 7.

When applying the multi-layer thin film capacitor 1 to an electric vehicle, large capacitance may be required. The multi-layer thin film capacitor 1 having large capacitance has a significantly wide surface area compared to a thickness. Accordingly, as shown in FIG. 1, a crack 6 may easily occur due to an environment of a vehicle, for example, temperature, impact, and the like.

In the multi-layer thin film capacitor 1, the crack 6 may very easily occur due to physical impact since the external electrode 5 is directly bonded on the soldering pad 7a of the printed circuit board 7, or the ceramic sintered body 2 is formed of different materials such as a dielectric material and a metal material. In addition, when the multi-layer thin film capacitor 1 is exposed to a high temperature environment, the crack 6 may easily occur due to different coefficients of expansion or different coefficients of brittle.

In the conventional multi-layer thin film capacitor, an external electrode mounted on a printed circuit board is directly connected to a ceramic sintered body and thus, impact or heat may be transferred to the ceramic sintered body through the external electrode. Accordingly, in the conventional multi-layer thin film capacitor, cracks may easily occur due to such impact or heat.

SUMMARY OF THE INVENTION

An aspect of the present invention provides a package type multi-layer thin film capacitor for large capacitance that may prevent, using a lead member, impact or heat transferred from an outside from being directly transferred to a ceramic sintered body and thereby prevent cracks from occurring due to the impact or the heat.

Another aspect of the present invention also provides a package type multi-layer thin film capacitor for large capacitance that may increase a contact surface between a connection electrode member and a lead member by increasing a surface area of the connection electrode member connected to a plurality of internal electrode layer, and thereby enhance an Equivalent Series Resistance (ESR) characteristic.

Another aspect of the present invention also provides a package type multi-layer thin film capacitor for large capacitance that may connect a plurality of internal electrode layers to have different polarity and thereby enhance an Equivalent Series Inductance (ESL) characteristic.

Another aspect of the present invention also provides a package type multi-layer thin film capacitor for large capacitance that may variably employ an ESR characteristic and an ESL characteristic by selectively employing a lead member.

According to an embodiment of the present invention, there is provided a package type multi-layer thin film capacitor for large capacitance, including: a ceramic sintered body formed with a slot on each of one side and another side thereof; a plurality of first internal electrode layers formed within the ceramic sintered body; a plurality of second internal electrode layers formed within the ceramic sintered body to be positioned between the plurality of first internal electrode layers; a pair of first main connection electrode members each inserted into the slot to be connected to the first internal electrode layer or the second internal electrode layer; a pair of first main lead members each inserted into the slot to be connected to the first main connection electrode connection member; and a sealing member sealing the ceramic sintered body to partially expose each of the pair of first main lead members.

According to another embodiment of the present invention, there is provided a package type multi-layer thin film capacitor for large capacitance, including: a ceramic sintered body formed with a slot on each of one side and another side thereof; a plurality of first internal electrode layers formed within the ceramic sintered body; a plurality of second internal electrode layers formed within the ceramic sintered body to be positioned between the plurality of first internal electrode layers; a pair of first main connection electrode members each inserted into the slot to be connected to the first internal electrode layer or the second internal electrode layer; a pair of first support connection electrode members each connected to the first internal electrode layer to cross the first main connection electrode member; a pair of second support connection electrode members each connected to the second internal electrode layer to cross the first main connection electrode member and to face the first support connection electrode member; a pair of first main lead members each inserted into the slot to be connected to the first main connection electrode member; a pair of first support lead members each connected to the first support connection electrode; a pair of second support lead members each connected to the second connection electrode member to face the first support lead member; and a sealing member sealing the ceramic sintered body to partially expose each of the pair of first main lead members, the pair of first support lead members, and the pair of second support lead members.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
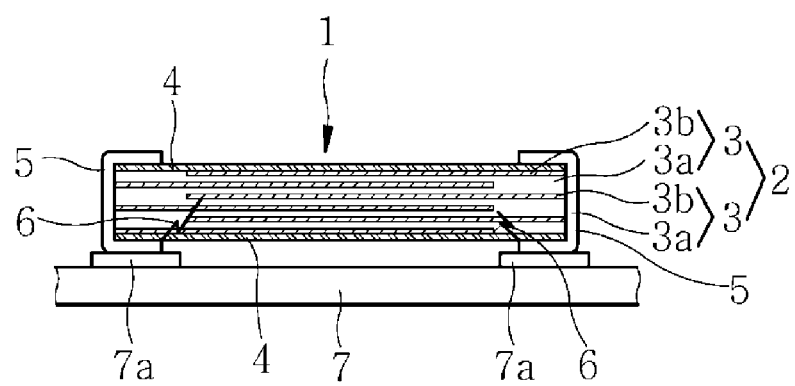
FIG. 1 is a cross-sectional view of a conventional multi-layer thin film capacitor.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a preparation method of a metal oxide doped monolith carbon aerogel for a high capacitance capacitor of the present invention will be described with reference to the accompanying drawings.

Figure 2:
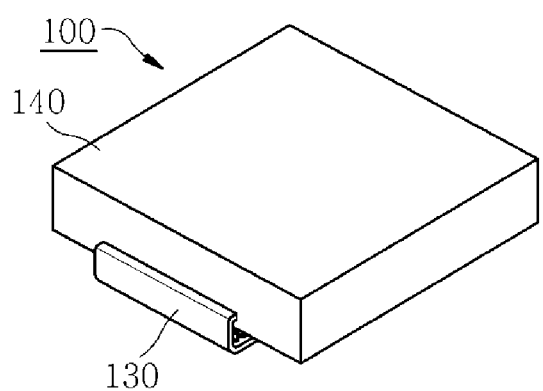
FIG. 2 is a perspective view of a package type multi-layer thin film capacitor for large capacitance according to an embodiment of the present invention.
Figure 3:
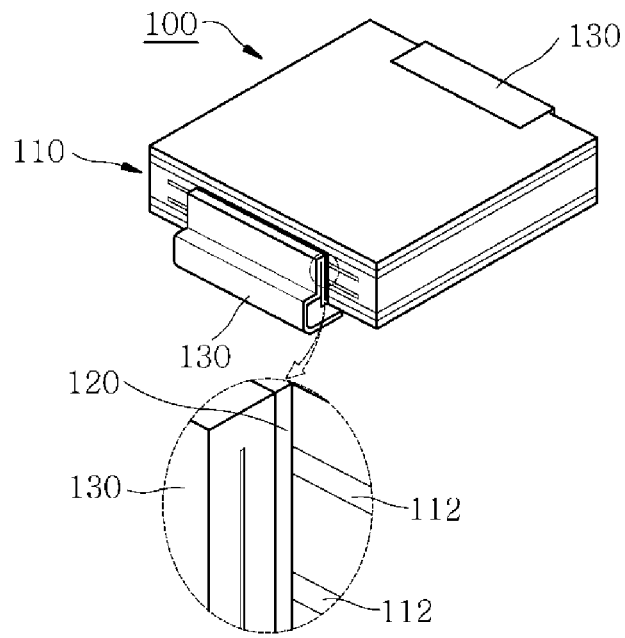
FIG. 3 is a perspective view illustrating a state in which a molding member is removed from the package type multi-layer thin film capacitor of FIG. 2.
Figure 4:
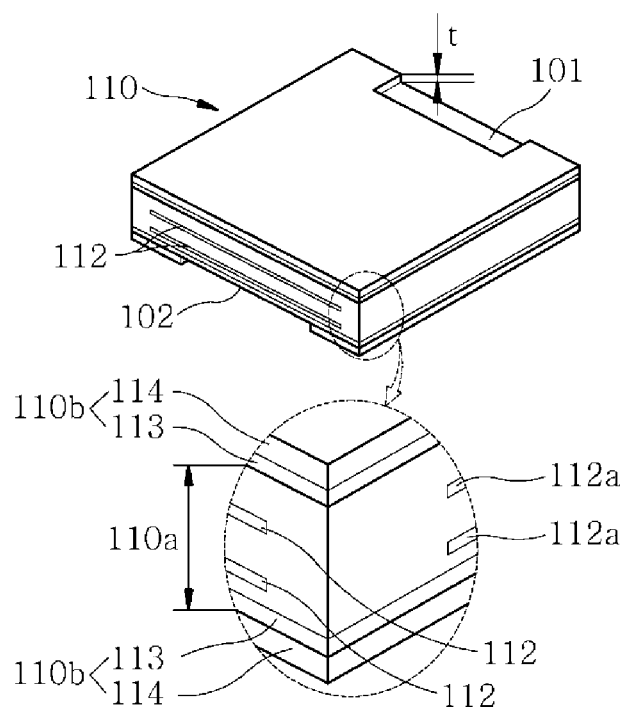
FIG. 4 is an enlarged perspective view of a ceramic sintered body of FIG. 3.

As shown in FIGS. 2 through 4, a package type multi-layer thin film capacitor 100 for large capacitance according to an embodiment of the present invention includes a ceramic sintered body 110, a plurality of first internal electrode layers 111, a plurality of second internal electrode layers 112, a pair of first main connection electrode members 120, a pair of first main lead members 130, and a sealing member 140.

The ceramic sintered body 110 is formed with slots 101 and 102 on one side and another side thereof, respectively, and the plurality of first internal electrode layers 111 is formed within the ceramic sintered body 110. The plurality of second internal electrode layers 112 is formed within the ceramic sintered body 110 to be positioned between the plurality of first internal electrode layers 111. The pair of first main connection electrode members 120 are inserted into the slots 101 and 102 to be connected to the first internal electrode layers 111 or the second internal electrode layers 112, respectively. The pair of first main lead members 130 are inserted into the slots 101 and 102 to be connected to the first main connection electrode members 120, respectively. The sealing member 140 seals the ceramic sintered body 110 to partially expose each of the pair of first main lead members 130.

Hereinafter, the package type multi-layer thin film capacitor 100 constructed as above according to an embodiment of the present invention will be further described with reference to the accompanying drawings.

As shown in FIGS. 3 and 4, the ceramic sintered body 110 includes a ceramic block 110a and an insulation coating member 110b.

The ceramic block 110a is formed with the plurality of first internal electrode layers 111 and the plurality of second internal electrode layers 112 to be positioned between the plurality of first internal electrode layers 111, respectively. Each of the plurality of first internal electrode layers 111 is formed on the ceramic block 110a to expose an end of one side thereof, and each of the plurality of second internal electrode layers 112 is formed on the ceramic block 110a to expose an end of another side thereof.

The insulation coating member 110b is disposed on each of top and bottom of the ceramic block 110a, is formed with the slot 101 or 102 on one side or another side thereof, and includes a first insulation coating layer 113 and a second insulation coating layer 114. The first insulation coating layer 113 is disposed on each of top and bottom of the ceramic block 110a, and the second insulation coating layer 114 is disposed on the first insulation coating layer 113 and formed with a slot opening groove 101a or 102a on one side or another side thereof. The second insulation coating layer 114 is disposed on the first insulation coating layer 113 to expose top of the first insulation coating layer 113 through the slot opening groove 101a or 102a. Each of the first insulation coating layer 113 and the second insulation coating layer 114 uses an insulating material.

Figure 7:
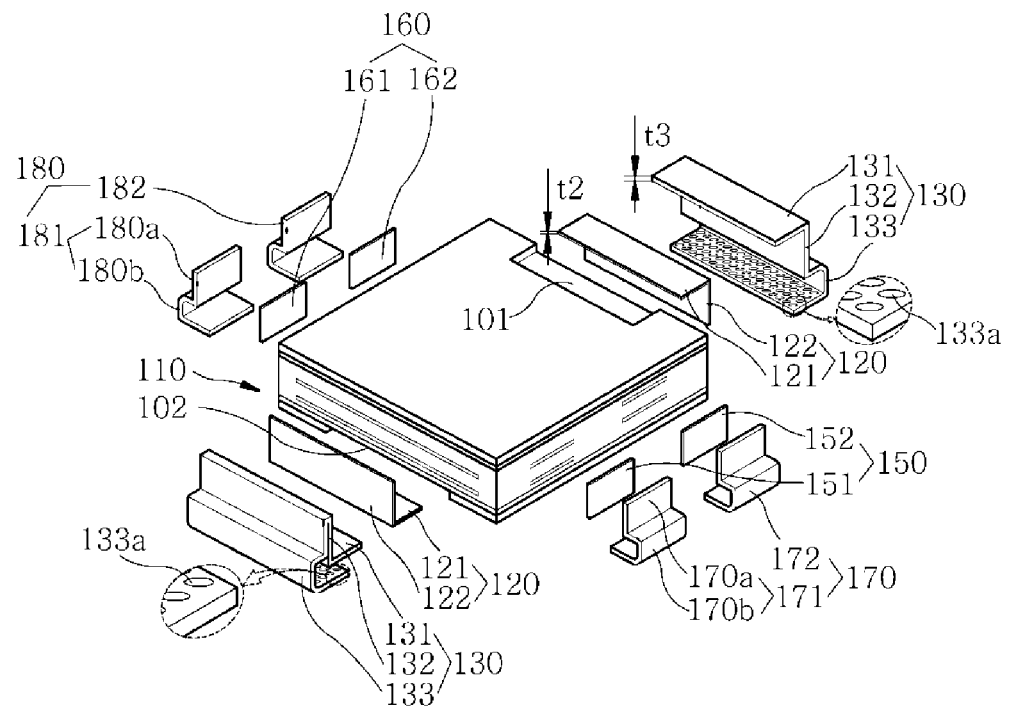
FIG. 7 is an exploded assembly perspective view of the package type multi-layer thin film capacitor of FIG. 6.
Figure 8:
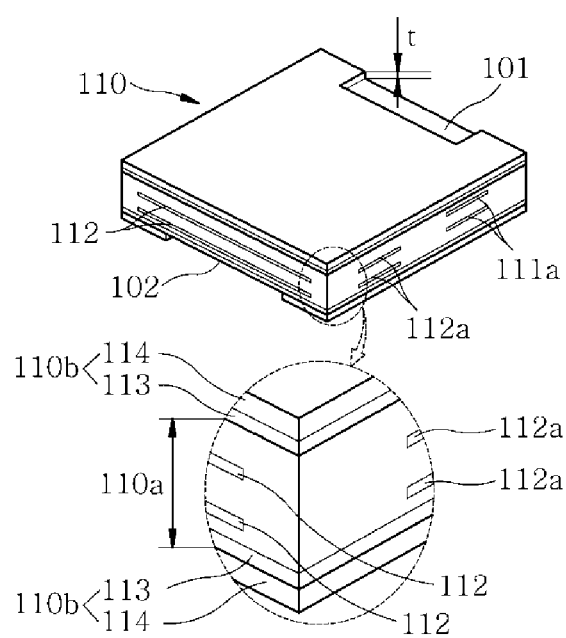
FIG. 8 is an enlarged perspective view of a ceramic sintered body of FIG. 7.
Figure 9:
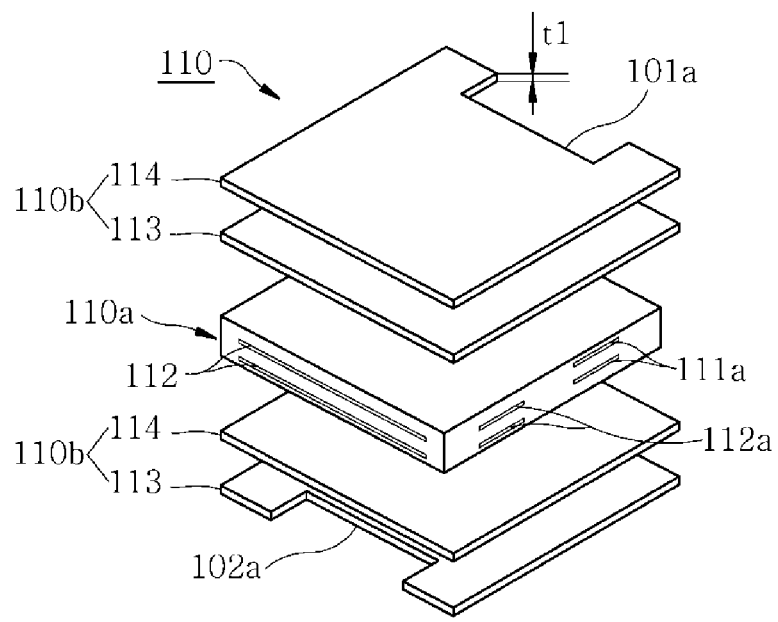
FIG. 9 is an exploded assembly perspective view of the ceramic sintered body of FIG. 8.
Figure 10:
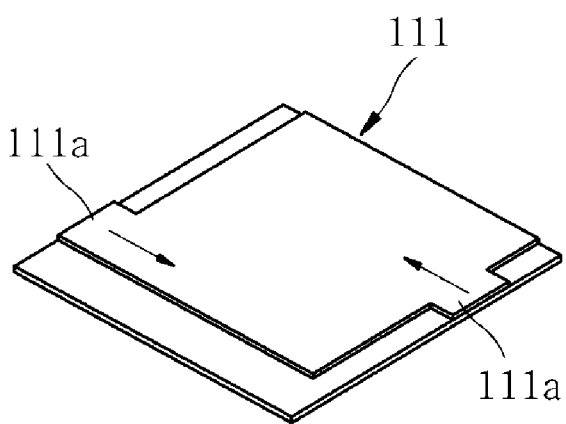
FIG. 10 is an enlarged perspective view of a first internal electrode layer of FIG. 9.
Figure 11:
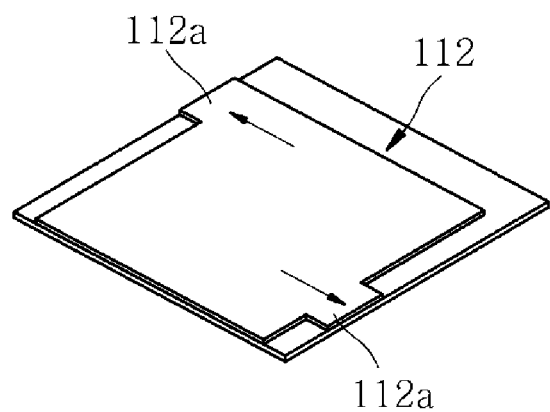
FIG. 11 is an enlarged perspective view of a second internal electrode layer of FIG. 9.

As shown in FIGS. 4, 7, and 9, a depth t of the slot 101 or 102 formed on the ceramic sintered body 110 may be formed to be identical to a thickness t1 of the second insulation coating layer (t=t1), or to be greater than or equal to a summation of a thickness t2 of the first main connection electrode member 120 and a thickness t3 of the first main lead member 130 (t=t2+t3 or t>t2+t3). Through this, the first main connection electrode member 120 or the first main lead member 130 may be inserted.

Figure 6:
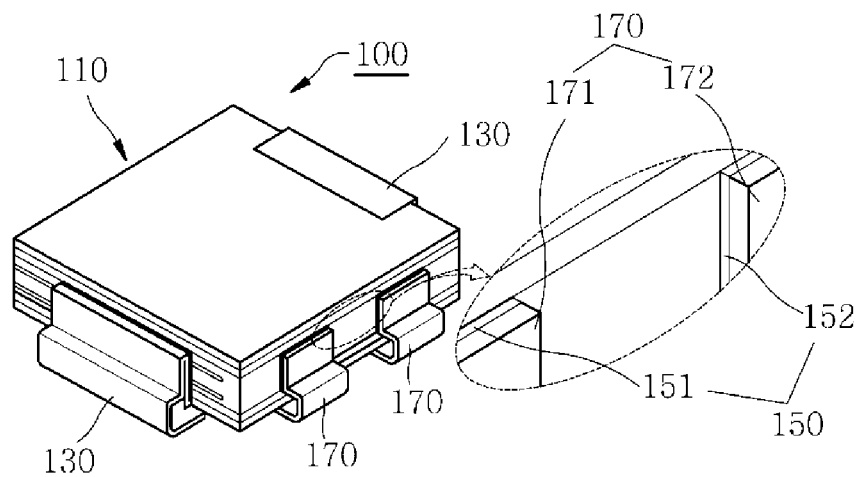
FIG. 6 is a perspective view illustrating a state in which a molding member is removed from the package type multi-layer thin film capacitor of FIG. 5.

Each of the pair of first main connection electrode members 120 may be formed by selecting one of copper (Cu), nickel (Ni), and silver (Ag), and by employing one of a screen printing scheme, a sputtering scheme, and a dipping scheme using a plating solution. As shown in FIGS. 3, 6, and 7, each of the pair of first main connection electrode members 120 includes a connection inserting portion 121 and a connection vertical portion 122. The connection inserting portion 121 is formed to be inserted into the slot 101 or 102 of the ceramic sintered body 110, and the connection vertical portion 122 is extended from the connection inserting portion 121 into a direction crossing the connection inserting portion 121 to thereby be connected to the first internal electrode layer 111 or the second internal electrode layer 112.

As shown in FIGS. 3, 6, and 7, each of the pair of first main lead members 130 includes a lead inserting portion 131, a lead vertical portion 132, and a buffer lead portion 133.

The lead inserting portion 131 is formed to be inserted into the slot 101 or 102 of the ceramic sintered body 110 and thereby be connected to the connection inserting portion 121. The lead vertical portion 132 is extended from the lead inserting portion 131 into a direction crossing the lead inserting portion 131 to be connected to the connection vertical portion 122. The buffer lead portion 133 is extended from the lead vertical portion 132 to support the ceramic sintered body 110. A plurality of holes 133a is formed to be aligned on bottom of the buffer lead portion 133. By uniformly dispersing conductive adhesives on bottom of the buffer lead portion 133 when mounting a single pair of first main lead members 130 on the soldering pad 7a (see FIG. 1) on the printed circuit board 7 (see FIG. 1) using the conductive adhesives, the plurality of holes 133a may be uniformly bonded with the soldering pad 7a and thereby be mounted.

The sealing member 140 is formed using a back-like material as shown in FIG. 2, and may seal the ceramic sintered body 110 to partially expose each of the pair of first main lead members 130, thereby preventing humidity or impact from being transferred to the ceramic sintered body 110.

As described above, the package type thin film capacitor 100 for large capacitance according to an embodiment of the present invention forms the slot 101 or 102 on top of one side or bottom of another side of the ceramic sintered body 110, and forms the pair of first main connection electrode members 120 to be connected to the plurality of first internal electrode layers 111 or the plurality of second internal electrode layers 112 in a state where the pair of first main connection electrode members 120 are inserted into the slots 101 and 102, respectively.

Since the pair of first main connection electrode members 120 are formed by a portion where the slots 101 and 102 are formed, each of the pair of first main connection electrode members 120 may increase a surface area thereof. The first main lead member 130 is connected to each of the pair of first main connection electrode members 120 with the increased surface area to thereby easily discharge, to an outside, heat transferred from an outside or generated from an inside of the ceramic sintered body 110. Also, by disposing the first main connection electrode member 120 between the ceramic sintered body 110 and the first main lead member 130, it is possible to prevent impact transferred from an outside from being transferred to the ceramic sintered body 110.

By easily discharging the heat generated from the ceramic sintered body 110 or transferred from the outside through the first main connection electrode member 120 and the first main lead member 130, and by preventing the impact transferred from the outside from being transferred to the ceramic sintered body 110, it is possible to prevent cracks from occurring due to the impact or the heat. In addition, by increasing the surface area of the first main connection electrode member 120, a contact area between the first main connection electrode member 120 and the first main lead member 130 may be increased, thereby enhancing an ESR characteristic to be decreased Hereinafter, another embodiment of the package type thin film capacitor 100 for large capacitance of the present invention having the above configuration and operation will be described with reference to the accompanying drawings.

As shown in FIGS. 5 through 8, the package type thin film capacitor 100 for large capacitance according to another embodiment of the present invention may include a ceramic sintered body 110, a plurality of first internal electrode layers 111, a plurality of second internal electrode layers 112, a pair of first main connection electrode members 120, a pair of first main lead members 130, a sealing member 140, a pair of first support connection electrode members 150, a pair of second support connection electrode members 160, a pair of first support lead members 170, and a pair of second support lead members 180.

The ceramic sintered body 110 is formed with slots 101 and 102 on top of one side and bottom of another side thereof, respectively, and the plurality of first internal electrode layers 111 is formed within the ceramic sintered body 110. The plurality of second internal electrode layers 112 is formed within the ceramic sintered body 110 to be positioned between the plurality of first internal electrode layers 111. The pair of first main connection electrode members 120 is inserted into the slots 101 and 102 to be connected to the first internal electrode layer 111 or the second internal electrode layer 112, respectively. Each of the pair of first support connection electrode members 150 is connected to the first internal electrode layer 111 to cross the first main connection electrode member 120. Each of the pair of second support connection electrode members 160 is connected to the second internal electrode layer 112 to cross the first main connection electrode member 120 and to face the first support connection electrode member 150.

The pair of first main lead members 130 are inserted into the slots 101 and 102 to be connected to the first main connection electrode members 120, and each of the pair of first support lead members 170 is connected to the first support connection electrode member 150. Each of the pair of second support lead members 180 is connected to the second support connection electrode member 160 to face the second support lead member 180. The sealing member 140 seals the ceramic sintered body 110 to partially expose each of the pair of first main lead members 130, the pair of second support lead members 180, and the pair of second support lead members 180.

Hereinafter, the package type multi-layer thin film capacitor 100 for large capacitance constructed as above according to another embodiment of the present invention will be further described with reference to the accompanying drawings.

In the configuration of the package type multi-layer thin film capacitor 100 according to another embodiment of the present invention, configurations and operations of the ceramic sintered body 110, the plurality of second internal electrode layers 112, the pair of first main connection electrode members 120, the pair of first main lead members 130, and the sealing member 140 will be the same as the aforementioned package type multi-layer thin film capacitor 100 according to an embodiment of the present invention and thus, a further detailed description related thereto will be omitted here.

As shown in FIGS. 8 through 11, a first input portion 111a is formed on each of both sides of each of the plurality of first internal electrode layers 111. The first input portion 111a is connected to one of an anode and a cathode. A second input portion 112a is formed on each of both sides of the plurality of second internal electrode layers 112 to be spaced apart from the first input portion 111a of the first internal electrode layer 111. The second input portion 112a is connected to one of the anode and the cathode. That is, by connecting the cathode to the second input portion 112a of the second internal electrode layer 112 when the anode is connected to the first input portion 111a of the first internal electrode layer 111, electrical signals having different polarity may be applied to the first internal electrode layer 111 and the second internal electrode layer 112 that are alternately disposed. Accordingly, the package type thin film capacitor 100 of the present invention may enhance an ESL characteristic by attenuating ESL. Here, indicators shown in FIGS. 10 and 11 indicate directions in which current flows, and the first internal electrode layer 111 and the second internal electrode layer 112 are formed on a green sheet member (reference numeral is not indicated).

Figure 5:
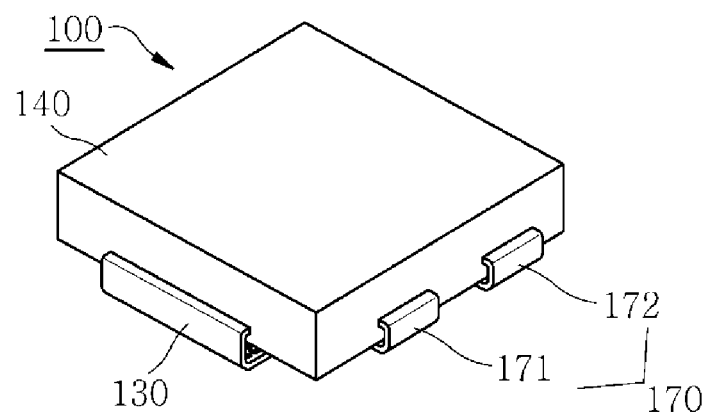
FIG. 5 is a perspective view of a package type multi-layer thin film capacitor for large capacitance according to another embodiment of the present invention.

Each of the pair of first support connection electrode members 150 and the pair of second support connection electrode members 160 may be formed by selecting one of copper (Cu), nickel (Ni), and silver (Ag), and by employing one of a screen printing scheme, a sputtering, scheme, and a dipping scheme using a plating solution. As shown in FIGS. 5 through 7, each of the pair of first support connection electrode members 150 includes first polar connection electrode members 171 and 172, and each of the pair of second support connection electrode members 160 includes the second polar connection electrode members 181 and 182.

As shown in FIGS. 5 through 7, the first polar connection electrode members 151 and 152 are connected to the first input portions 111a of the plurality of first internal electrode layers 111, respectively. The second polar connection electrode members 161 and 162 are spaced apart from the first polar connection electrode members 151 and 152 to be connected to the second input portions 112a of the plurality of second internal electrode layers 112, respectively. The first polar connection electrode members 151 and 152, and the second polar connection electrode members 152 and 162 have different polarity. For example, when the first polar connection electrode members 151 and 152 are employed as an anode, the second polar connection electrode members 161 and 162 are employed as a cathode. Accordingly, the first polar connection electrode members 151 and 152, and the second polar connection electrode members 161 and 162 apply an electrical signal of the anode to the first input portions 111a and apply an electrical signal of the cathode to the second input portions 112a.

As shown in FIGS. 5 through 7, each of the pair of first support lead members 170 includes first polar lead members 171 and 172, and each of the pair of second support lead members 180 includes second polar lead members 181 and 182.

The first polar lead members 171 and 172 are connected to the first polar connection electrode members 151 and 152, respectively. The second polar lead members 181 and 182 are spaced apart from the first polar lead members 171 and 172 to be connected to the second polar connection electrode members 161 and 162, respectively. The first polar lead members 171 and 172, and the second polar lead members 181 and 182 have different polarity. That is, when the first polar lead members 171 and 172 are employed as an anode, the second polar lead members 181 and 182 are employed as a cathode. Accordingly, an electrical signal of the anode is applied to the first polar connection electrode members 151 and 152, and an electrical signal of the cathode is applied to the second polar connection electrode members 161 and 162.

The pair of first polar lead members 171 and 172 and the second polar lead members 181 and 182 have different polarity, and include lead vertical portions 170a and 180a, and buffer lead portions 170b and 180b, respectively. The lead vertical portions 170a and 180a are connected to the first polar connection electrode members 151 and 152 or the second polar connection electrode members 161 and 162, respectively. The buffer lead portions 170b and 180b are extended from the lead vertical portions 170a and 180a, respectively, to support the ceramic sintered body 110.

As described above, the package type thin film capacitor 100 for large capacitance according to another embodiment of the present invention may enhance an ESL characteristic by connecting the connection electrode members 151,152, 161, and 162 to the plurality of internal electrode layers 111 and 112 to have different polarity. Also, the package type thin film capacitor 100 for large capacitance according to another embodiment of the present invention may enable an ESR characteristic and an ESL characteristic to be variably employed by selectively employing the lead members 130, 170, and 180. Accordingly, a single package type thin film capacitor for large capacitance may be employed for various purposes.

As described above, a package type thin film capacitor for large capacitance of the present invention may prevent cracks from occurring due to impact or heat by preventing the impact or heat transferred from an outside from being directly transferred to a ceramic sintered body. In addition, the package type thin film capacitor may enhance an ESR characteristic by increasing a surface area of connection electrode member to be connected to a plurality of internal electrode layers and by increasing a contact area between the connection electrode member and a lead member, may enhance an ESL characteristic by connecting the connection electrode member to the plurality of internal electrode layers to have different polarity, and may variably employ the ESR characteristic and the ESL characteristic by selectively employing the lead members. Accordingly, a single package type thin film capacitor for large capacitance may be employed for various purposes.

The package type thin film capacitor for large capacitance of the present invention may be applied for electronic equipment of an industrial field or an electric vehicle field.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A package type multi-layer thin film capacitor for large capacitance, comprising:
    a ceramic sintered body formed with a slot on each of one side and another side thereof;
    a plurality of first internal electrode layers formed within the ceramic sintered body;
    a plurality of second internal electrode layers formed within the ceramic sintered body to be positioned between the plurality of first internal electrode layers;
    a pair of first main connection electrode members each inserted into the slot to be connected to the first internal electrode layer or the second internal electrode layer;
    a pair of first main lead members each inserted into the slot to be connected to the first main connection electrode connection member; and a sealing member sealing the ceramic sintered body to partially expose each of the pair of first main lead members.

2. The package type multi-layer thin film capacitor of claim 1, wherein the ceramic sintered body comprises:
a ceramic block formed with the plurality of first internal electrode layers and the plurality of second internal electrode layers to be positioned between the plurality of first internal electrode layers, respectively; and
an insulation coating member coated on each of top and bottom of the ceramic block and formed with a slot on either one side or another side thereof,
wherein each of the plurality of first internal electrode layers is formed on the ceramic block to expose an end of one side thereof, and each of the plurality of second internal electrode layers is formed on the ceramic block to expose an end of another side thereof.

3. The package type multi-layer thin film capacitor of claim 2, wherein the insulation coating member comprises:
a first insulation coating layer disposed on each of top and bottom of the ceramic block; and
a second insulation coating layer disposed on the first insulation coating layer and formed with a slot opening groove on one side or another side thereof,
wherein the second insulation coating layer is disposed on the first insulation coating layer to expose top of the first insulation coating layer through the slot opening groove.

4. The package type multi-layer thin film capacitor of claim 2, wherein a depth of the slot is identical to a thickness of the second insulation coating layer.

5. The package type multi-layer thin film capacitor of claim 2, wherein a depth of the slot is greater than or equal to a summation of a thickness of the first main connection electrode member and a thickness of the first main lead member.

6. The package type multi-layer thin film capacitor of claim 1, wherein each of the pair of first main connection electrode members is formed by selecting one of copper (Cu), nickel (Ni), and silver (Ag), and by employing one of a screen printing scheme, a sputtering scheme, and a dipping scheme using a plating solution.

7. The package type multi-layer thin film capacitor of claim 1, wherein each of the pair of first main connection electrode members comprises:
a connection inserting portion formed to be inserted into the slot of the ceramic sintered body; and
a connection vertical portion extended from the connection inserting portion into a direction crossing the connection inserting portion to thereby be connected to the first internal electrode layer or the second internal electrode layer.

8. The package type multi-layer thin film capacitor of claim 1, wherein each of the pair of first main lead members comprises:
a lead inserting portion inserted into the slot of the ceramic sintered body to be connected to a connection inserting portion;
a lead vertical portion extended from the lead inserting portion into a direction crossing the lead inserting portion to be connected to a connection vertical portion; and
a buffer lead portion extended from the lead vertical portion to support the ceramic sintered body,
wherein a plurality of holes is formed to be aligned on bottom of the buffer lead portion.

9. A package type multi-layer thin film capacitor for large capacitance, comprising:
a ceramic sintered body formed with a slot on each of one side and another side thereof;
a plurality of first internal electrode layers formed within the ceramic sintered body;
a plurality of second internal electrode layers formed within the ceramic sintered body to be positioned between the plurality of first internal electrode layers;
a pair of first main connection electrode members each inserted into the slot to be connected to the first internal electrode layer or the second internal electrode layer;
a pair of first support connection electrode members each connected to the first internal electrode layer to cross the first main connection electrode member;
a pair of second support connection electrode members each connected to the second internal electrode layer to cross the first main connection electrode member and to face the first support connection electrode member;
a pair of first main lead members each inserted into the slot to be connected to the first main connection electrode member;
a pair of first support lead members each connected to the first support connection electrode;
a pair of second support lead members each connected to the second connection electrode member to face the first support lead member; and
a sealing member sealing the ceramic sintered body to partially expose each of the pair of first main lead members, the pair of first support lead members, and the pair of second support lead members.

10. The package type multi-layer thin film capacitor of claim 9, wherein the ceramic sintered body comprises:
a ceramic block formed with the plurality of first internal electrode layers and the plurality of second internal electrode layers to be positioned between the plurality of first internal electrode layers, respectively; and
an insulation coating member coated on each of top and bottom of the ceramic block and formed with a slot on either one side or another side thereof,
wherein a first input portion is formed on each of both sides of each of the plurality of first internal electrode layers, and a second input portion is formed on each of both sides of each of the plurality of second internal electrode layers to be spaced apart from the first input portion of the first internal electrode layer.

11. The package type multi-layer thin film capacitor of claim 9, wherein each of the pair of first support connection electrode members and the pair of second support connection electrode members is formed by selecting one of copper (Cu), nickel (Ni), and silver (Ag), and by employing one of a screen printing scheme, a sputtering, scheme, and a dipping scheme using a plating solution.

12. The package type multi-layer thin film capacitor of claim 9, wherein each of the pair of first support connection electrode members and the pair of second support connection electrode members comprises:
a first polar connection electrode member connected to a first input portion of each of the plurality of first internal electrode layers;
a second polar connection electrode member spaced apart from the first polar connection electrode member to be connected to a second input portion of each of the plurality of second internal electrode layers, and
the first polar connection electrode member and the second polar connection electrode member have different polarity.

13. The package type multi-layer thin film capacitor of claim 12, wherein in the case of the first polar connection electrode member and the second polar connection electrode member, when the first polar connection electrode member is employed as an anode, the second polar connection electrode member is employed as a cathode.

14. The package type multi-layer thin film capacitor of claim 9, wherein each of the pair of first support lead members and the pair of second support lead members comprises:
   a first polar lead member connected to the first polar connection electrode member; and
   a second polar lead member spaced apart from the first polar lead member to be connected to the second polar connection electrode member, and
   the first polar lead member and the second polar lead member have different polarity.

15. The package type multi-layer thin film capacitor of claim 14, wherein in the case of the first polar lead member and the second polar lead member, when the first polar lead member is employed as an anode, the second polar lead member is employed as a cathode.

16. The package type multi-layer thin film capacitor of claim 14, wherein each of the first polar lead member and the second polar lead member comprises:
   a lead vertical portion connected to the first polar connection electrode member or the second polar connection electrode member; and
   a buffer lead portion extended from the lead vertical portion to support the ceramic sintered body.

* * * * *